United States Patent [19]

Adler et al.

[11] 3,860,752

[45] Jan. 14, 1975

[54] VIRTUAL IMAGE DISPLAY SYSTEM WITH STEREO AND MULTI-CHANNEL CAPABILITY

[75] Inventors: Robert Adler, Northfield; Adrianus Korpel, Prospects Heights, both of Ill.

[73] Assignee: Zenith Radio Corporation, Chicago, Ill.

[22] Filed: Jan. 26, 1973

[21] Appl. No.: 327,059

Related U.S. Application Data

[63] Continuation of Ser. No. 121,302, March 5, 1971, abandoned.

[30] Foreign Application Priority Data

Dec. 6, 1971 Canada ............................... 129413

[52] U.S. Cl.......... 178/7.3 D, 178/6.5, 178/DIG. 18, 350/161, 358/56, 358/62

[51] Int. Cl......... H04n 5/74, H04n 9/12, H04n 9/58

[58] Field of Search....... 178/5.4 R, 5.4 BD, 5.4 ES, 178/6.5, 7.3 D, 7.5 D, 7.6, 7.92, DIG. 18; 250/199; 350/160 R, 161

[56] References Cited

UNITED STATES PATENTS 3,524,011 8/1970 Korpel ............................... 178/5.4

*Primary Examiner*—Robert L. Griffin
*Assistant Examiner*—George G. Stellar

[57] ABSTRACT

This disclosure depicts a virtual image viewing system including a component to be worn by an observer in the manner of spectacles, the system being responsive to a source of video signals and associated deflection signals and to a laser beam for establishing a virtual optical image representing said video signals which is visible only to the observer. In one embodiment the system includes flying spot scanning means which is responsive to the deflection signals and which receives the laser beam for deflecting the beam in two dimensions and for converging the beam to form an unmodulated flying spot raster. A Bragg light-sound interaction cell constituting the component to be worn is responsive to the video signals and receives light from the flying spot raster for modulating the received light to develop a virtual image representing the video signals which is visible only to the observer. Other embodiments are depicted.

4 Claims, 13 Drawing Figures

VIRTUAL IMAGE DISPLAY SYSTEM WITH STEREO AND MULTI-CHANNEL CAPABILITY

CROSS REFERENCE TO RELATED APPLICATIONS

This application is a continuation of copending application Ser. No. 121,302 filed Mar. 5, 1971, assigned to the assignee of the present invention, now abandoned.

BACKGROUND OF THE INVENTION

The present invention relates to video systems, and more particularly to two-dimensionalvirtual image display systems which do not utilize the conventional apparatus creating a real image over a display surface.

One conventional image display system using such conventional apparatus is the television receiver having a cathode-ray tube in which an electron beam impinges on a phosphor surface, giving off visible light at the locus where such impingement occurs. The electron beam is repeatedly deflected horizontally and vertically to define a display raster, while image information is provided by video signals which modulate electron beam intensity. In addition to this standard image display, other types of real-image display apparatus have been used, such as a panel of a matrix array of discrete electrically illuminated elements, each of which require programmed energization to display an image.

A fundamental limitation of all such real-image conventional displays is the difficulty which would be experienced in providing each eye with its own image, so that a stereo imaging capability results. A similar problem would be presented in providing different viewers with different respective image information channels in order to insure the simultaneous but private communication of different information to each viewer.

Therefore it is an object of the present invention to provide a new image display system.

It is another object of the present invention to provide an image display system wherein the image is a virtual rather than a real image, yet which has characteristics such as apparent size and fixed position comparable to those provided by more conventional image displays.

It is yet another object of the invention to provide a light beam device which may be substituted for conventional electronic apparatus to provide a television image display.

It is a further object of the invention to provide a virtual image display system adaptable to the production of stereoscopic three-dimensional virtual images as well as to the simultaneous communication of individually different displays to respective different viewers.

It is a more particular object of the invention to provide a light-sound interaction cell of improved efficiency for use in such novel displays.

DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

DESCRIPTION OF THE PREFERRED EMBODIMENT

Figure 1:
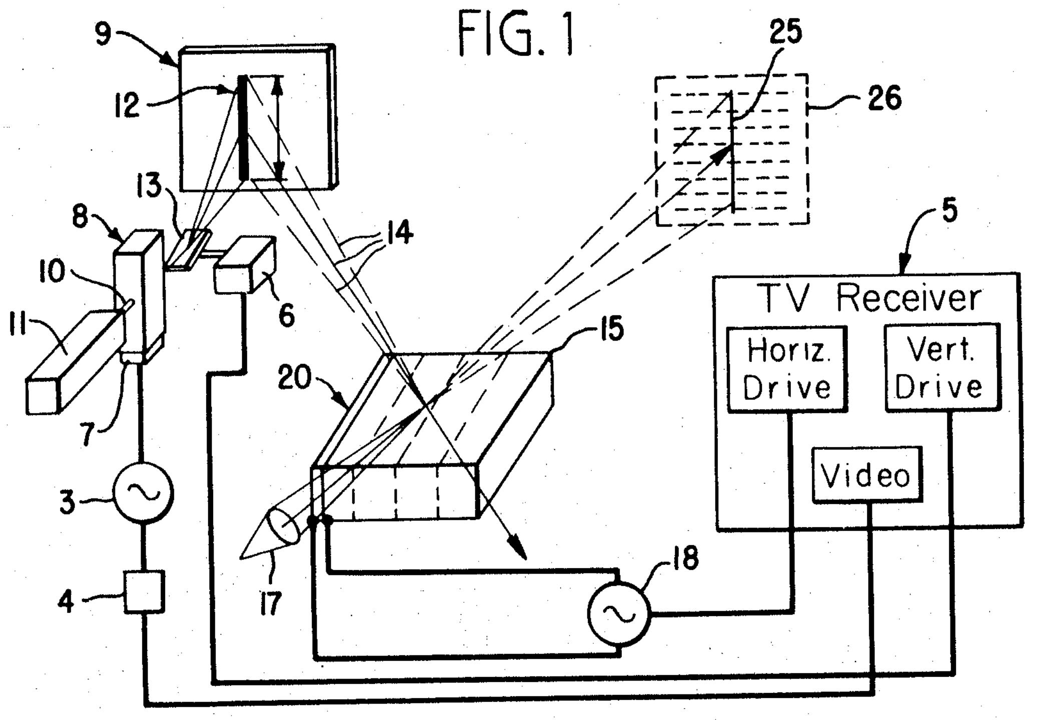
FIG. 1 is a perspective view schematically showing a complete virtual image display system according to the invention.
Figure 1A:
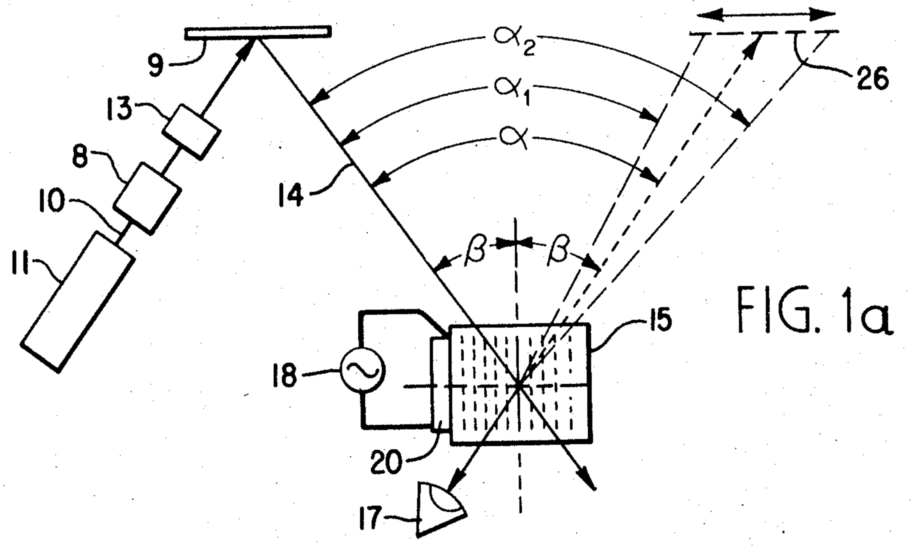
FIG. 1*a* is a top view of the system of FIG. 1.

The image display device of FIGS. 1 and 1*a* includes a source 11 of a monochromatic light beam 10, a light intensity modulator 8 interposed in the path of beam 10, a scanner 13 receiving the light beam, and a screen 9 intercepting and displaying the light output of scanner 13. Source 11 is a helium-neon laser operated to provide 6328 Angstrom wavelength light. Scanner 13 is advantageously a simple mirror, driven by a transducer 6, which may be a simple galvanometer movement. The vertical sweep circuit of a conventional television receiver 5 is connected to the transducer 6 and actuates the transducer to scan the mirror supplying a signal at the usual television vertical scan rate of 60 hertz. The light thereby scanned sweeps out what to the unaided eye appears to be a continuously illuminated, very narrow vertical line of light 12 upon screen 9, which may be any convenient diffusely reflective surface such as a white wall.

The modulator 8 is a Bragg cell with transducer 7 connected to a source of high frequency carrier signal 3. Through modulator 4, this carrier is modulated by video signals derived from the video circuitry of conventional television receiver 5. The cell is oriented with respect to beam 10 so that it imposes intensity modulation upon the beam 10 in accordance with the amplitude modulation of a constant carrier frequency applied to transducer 7 as explained in more detail in U.S. Pat. No. 3,431,504 to Robert Adler and assigned to the same assignee as the present invention. The modulator 8 could also be any of a number of well-known electro-optical light intensity modulators as well, rather than an acousto-optic modulator as just described. In either case, the amplitude modulation is in accordance with the conventional video signal of a time-sequential character detected by the conventional television receiver 5 and represented in the FIG. 2, which shows the amplitude changes with time during one scan line time period T. The video information may alternatively be modulated upon the light by other means, as will later be described; in that case modulator 8 may be eliminated, and the mirror scanner 13 directly receives beam 10 from the laser source 11. It should also be noted that the mirror scanner 13 may be eliminated in favor of a Bragg cell driven by a signal sweeping at a rate in accordance with the vertical synchronization of receiver 5 of 60 hertz, over a range of frequencies such that beam 10 sweeps out an illuminated line 12 upon screen 9, as previously described.

Light rays 14 from light line 12 reflected by screen 9 are received by a diffraction cell viewing device 15 which is placed close to an observer's eye 17 in the manner of spectacles. The viewing cell 15 embodies a transparent sound conducting medium, for instance, of a tellurium dioxide crystal. Transducer 20 is mounted at one end of the cell and launches planar acoustic wavefronts within cell 15 propagating to the opposite end in response to signals from generator 18 which interact with the received light rays 14 to diffract the light rays. The cell is positioned before the eye of the viewer 17 and with relation to the illuminated strip 12 so that the light rays 14 from strip 12 enter the cell in a direction nearly transverse to that of the sound propagation. Generator 18 produces a signal which repetitively sweeps a predetermined range of frequencies and is connected to the horizontal drive circuitry of television receiver 5 so as to be synchronized therewith, as is described below in greater detail.

The cell position must be such that the light rays incident from line 12 make an angle $\beta$, illustrated in schematic form in FIG. 1*a*, with the plane of the sound wavefronts satisfying the following condition:

$$\sin \beta = \tfrac{1}{2}\, \lambda/\lambda_s \qquad (1)$$

or, for small angles $\beta$, $$\beta = \lambda/2\lambda_s \qquad (2)$$

where $\lambda$ is the wavelength of the incoming light and $\lambda_s$ is the nominal wavelength of the sound within cell 15. In practice, with the viewing cell 15 worn before the eye in the manner of spectacles the viewer turns his head, and with it the cell 15, slightly until a display is visible, thus accomplishing the above-described positional orientation of the cell.

Since equation (1) is the condition for Bragg diffraction, the diffracted light, emerging from the viewing cell 15 at the same angle $\beta$ with respect to a sound wavefront, will arrive in a single order at the viewer's eye 17. Consequently the viewer would see a displaced and virtual image 25 of line 12, as indicated in FIG. 1, if the frequency of the acoustic signal applied by transducer 20 were held constant. If line 12 were merely a point of light, the viewer would see a displaced and virtual point image. For a more detailed explanation of the principle of such Bragg diffraction, see the aforementioned Adler patent.

The angle $\alpha$ is the angle between the incident light and the projection of the light diffracted to the viewer's eye; it is seen from FIG. 1*a* to equal twice the Bragg angle. Thus, from equation (1), the displaced and virtual line or point image 25 which will be seen through the viewing cell 15 when sound waves of wavelength $\lambda_s$ are present within cell 15 will be oriented at the angle $\alpha$; similarly, each sound wavelength in a range of $\lambda_s$ to $\lambda_s$ will be associated with a diffraction angle in a range from $\alpha_1$ to $\alpha_2$.

The vertically swept line 12 may be considered as a vertical series of points each of which, if developed in the orthogonal direction, would give rise to a line of picture elements By causing generator 18 to supply to transducer 20 a signal which sweeps over a range of frequencies as set forth below so that the video-modulated light received from each point on line 12 by cell 15 yields a line of virtual picture elements, virtual image 26 is made to appear to the viewer's eye 17 positioned behind viewing cell 15. The sweep is synchronized to the horizontal sweep of 15,750 lines per second of the same convention television receiver 5 whose vertical sweep controls scanner 13, and consequently a complete television virtual image 26 is obtained. The resolution obtainable in the virtual image 26 is comparable to that seen on a conventional television screen.

In order to afford the viewer an image 26 having an apparent size comparable to that of a conventional cathode-ray television screen, say 24 cm (diagonal ≈ 12 inches), as viewed from a normal viewing distance of 2.4 meters (or 8 feet), the range $\alpha_2 - \alpha_1$, or $\Delta\alpha_1$, of angular sweep needed is approximately 100 milliradians. To provide the relatively large values for the $\alpha$ deflection angles, for such a 100 milliradian angular range the range of frequencies of the horizontal sweep applied to cell 15 by generator 18 which we shall now call $\Delta f_s$, must encompass approximately 100 megahertz. In order to provide this 100 megahert bandwidth, a frequency range for instance, of 100 to 200 megahertz is swept by the generator 18 and applied to the transducer 20.

The above-described system may be readily extended to provide a three-dimensional stereo display system, since two separate viewing cells, one for each eye, may be provided, with each cell having its own respective video modulation to accommodate two independent video channels. Moreover, a like system to accommodate a plurality of independent video channels, for providing different images to different viewers simultaneously and privately, may be set up in the same manner. As many viewing cells as there are viewers or channels desired are provided in this case, with each such channel or cell having its own respective video modulation, the two-dimensional stereo system and the multiple-channel system being alike except for the latter having more channels and corresponding viewing cells. A schematic illustration of a related stereo system may be found in FIG. 7; it will be described in detail below.

Figures 3, 5, 5A:
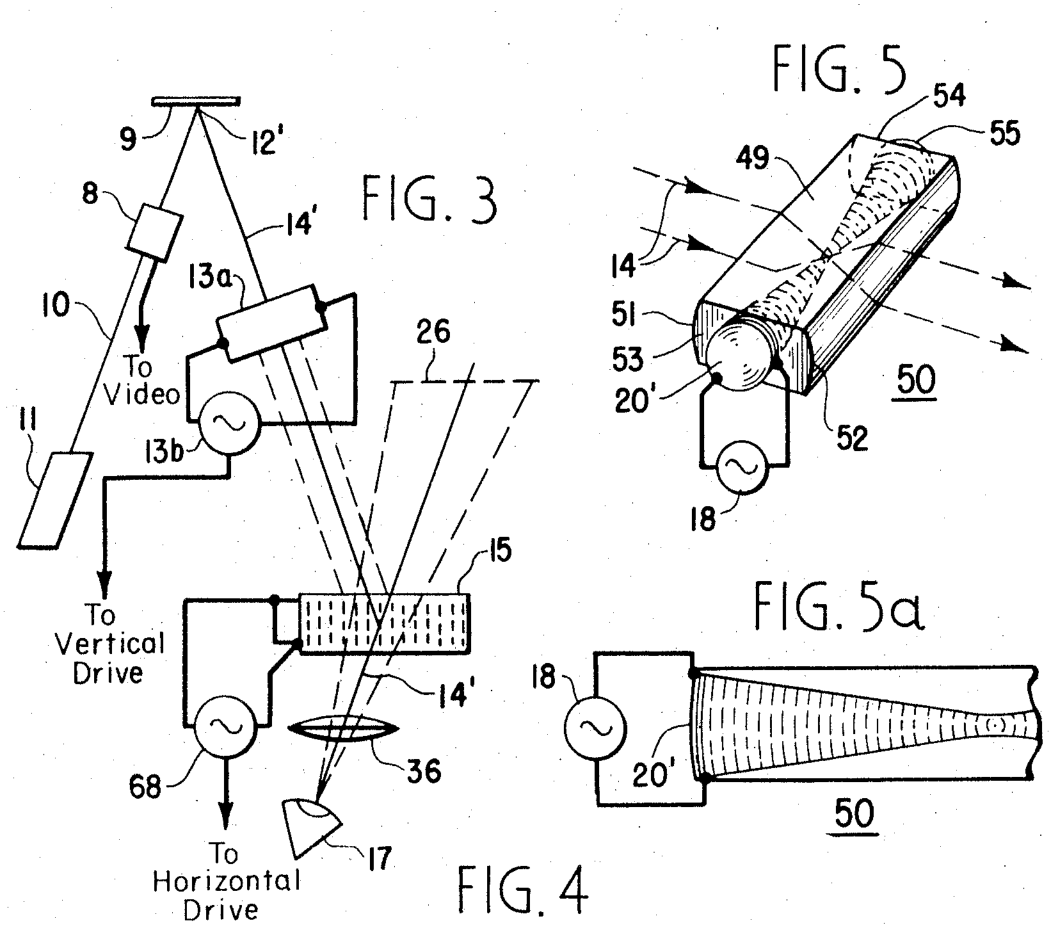
FIG. 3 is a top view schematically showing a second image display adaptable for virtual image display in full color.
FIG. 5 is a perspective view of an improved light-sound interaction cell according to another aspect of the invention.
FIG. 5*a* is a fragmentary cross-sectional view of the light-sound interaction cell of FIG. 5 showing a detail of the curved transducer and curved wavefront sound beam.

FIG. 3 represents schematically yet another system for virtual imaging which does not scan the laser beam over a screen as does the FIG. 1 system. As viewed from above, the beam 10 emanating from the laser source 11 proceeds to a light modulator 8 as in FIG. 1 and thereafter to screen 9, creating thereon a spot 12′ of light rather than a line of light as before. The light modulator 8 is connected as previously to the video stage of a television receiver so that the spot of light is intensity-modulated in accordance with the video signal. The vertical scanning operation is now done on the reflected beam 14', with the scanner **13*a* interposed in the path of the reflected beam 14' for this purpose. Scanner 13*a* is a Bragg cell driven by a signal from variable frequency generator 13*b* to produce planar sound wavefronts propagating in the vertical direction; i.e., perpendicular to the plane of the drawing. In turn, generator 13*b* is connected to the vertical drive of conventional television receiver 5 so that the generated signal repetitively sweeps over a fixed frequency range in synchronization with the receiver's vertical sweep. The scanning light output of cell 13*a* is then received by the viewing cell 15 for deflection in the orthogonal direction, with the cell 15 fixedly oriented with respect to cell 13*a* so that the light output is incident upon the planar sound wavefronts within the viewing cell, in accordance with the Bragg-angle relationship of equation (1). The viewing cell 15 has parts and associated components as described in connection with FIG. 1 and is driven in the same manner to produce the virtual display 26. The cell 13a is oriented relative to the light rays 14' reflected from spot 12' on screen 9 so that the light rays are incident upon the planar sound wavefronts in accordance with the Bragg relationship of equation (1). A telescopic spherical lens system 36 may be used to increase the effective convergence of light rays 14'** and thus the size of the virtual image. Accordingly, the two cells and the telescopic lens system may be packaged as a unit and worn in the manner of spectacles.

It should be noted that intensity modulation of the light entering vertical scanner 13a may also be accomplished by placing light modulator 8 in the path of the reflected beam 14' rather than, as before in the path of beam 10. This permits the light modulator 8 to also be packaged with the scanning cells as a single viewing unit to be worn in the manner of spectacles. As in the FIG. 1 case, this system may be expanded to provide stereo and private viewing for different viewers by suitable duplication to accommodate the necessary independent video channels. Also, the light intensity modulation need not be accomplished acousto-optically; instead, any of a number of well-known electro-optic light intensity modulators could be used as well. It should further be noted that acousto-optic means of accomplishing the scanning functions of virtual imaging may be dispensed with in favor of other means. For example, a cathode-ray tube with appropriately short persistence (a flying spot scanner) may be used to create one or both scan components of a raster, thereby producing visible light which is then further acted upon, as for example, being observed through the medium of an electro-optic light intensity modulator imposing the video modulation, thereby presenting the viewer with a complete virtual display.

Figure 4:
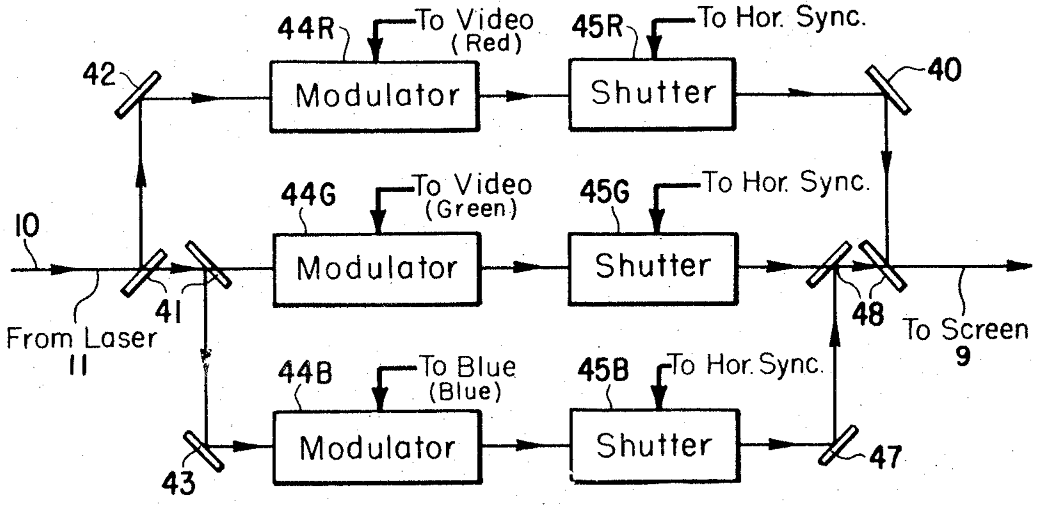
FIG. 4 is a detailed schematic representation of the light intensity modulator and shutter arrangement to be used in the color version of the FIG. 3 system.

FIG. 3 may also serve as the schematic illustration of a system similar to that described above, but for creating a virtual image in full color. The laser source 11 in this case is one from which the three primary red, green and blue colors may be derived, such as an argon-krypton laser. The light modulator 8 now includes components for processing three colors as well as a light-shutter arrangement and is illustrated in greater detail in FIG. 4. Beam 10 from the argon-krypton laser is incident upon the dichroic mirrors 41 which separate the beam into three beams, each of a single primary color, the red beam proceeding up to mirror 42, the blue to mirror 43, and the green continuing in the direction of the original beam 10. The separated beams pass through the intensity modulators 44R, 44B and 44G which are Bragg cells and are essentially similar in operation to the light modulator 8 already described, receiving signals respectively derived from the red, green and blue video signals supplied by the video section of a conventional color television receiver and modulating the intensity of the respective beams accordingly. The modulated beams pass to respective light shutter devices 45R, 45G and 45B, each of which is synchronized with the horizontal drive of a conventional color television receiver to open in sequence for the duration of one line scan time interval (approximately 64 microseconds) while the other shutters are kept closed. Mirrors 40 and 47 as well as a second set of dichroic mirrors 48 recombine the three beams into one path and direct the emergent light to screen 9 so that only one spot 12' is illuminated as before, but with light spot 12' now rapidly changing in color with the completion of each line scan interval in a continuous red, green blue sequence.

The light scanning of the reflected light to form a virtual image by means of orthogonal Bragg cells is similar to that previously set forth above in connection with FIG. 3, except for the addition of conventional circuitry to generators 13b and 18 to change the deflection frequencies with the changes in light color to keep the range of scan angles the same for each color and preferably in conformity with the red. Correct color registration is thereby assured, and a virtual color image will appear, apparently positioned at 26, to the viewer observing through cell 15 held in the proper Bragg angle orientation for the red color wavelength. As in the previously described related system, the vertical scanner **13*a* may be a mirror scanning in synchronization with the vertical drive of a television receiver and positioned either to scan the light reflected from screen 9, as does scanner 13*a*, or between modulator 8 and screen 9.**

On viewing a television display through a Bragg cell such as viewing cell 15, the viewer must keep the position of the cell, and therefore of his head if the cell is worn in the manner of spectacles, relatively fixed so as to maintain the Bragg angle relationship between the incoming light rays 14 or 14' and the direction of propagation of the sound wavefronts within the cell. Although the apparent position of the image remains unaffected by small movements of the head, the brightness of the image is diminished until with a sufficient rotation it vanishes altogether since only at the Bragg orientation is maximum light-sound interaction efficiency obtained.

FIGS. 5 and **5*a* illustrate an alternative form of viewing cell which mitigates the fixed-position requirement, allowing a tolerance of 100 milliradians, or approximately 6° in rotational movement within which the viewer's perception of the television image will not be affected. This modified viewing cell 50 may be used in place of cell 15 in the FIG. 1 embodiment or in place of cell 13*a* in FIG. 2. It includes a light-sound interaction member 49 of sound-conducting light-transmissive material, preferably $TeO_2$, provided with cylindrical lenses 51 and 52 which may either be made integral with member 49 or be attached to opposite sides of the interaction member 49 along its length which respectively receive incoming light rays 14 and transmit the diffracted light to the viewer's eye; lenses 51 and 52 also act as a 1 × 1 telescope to cause the light entering the interaction member 49** to be focused in a region about a central longitudinal axis of that member, as shown.

Transducer 20', a cross-sectional detail of which is seen in FIG. 5*a*, is mounted at one end 53 of the interaction member 49 to present to that member a concave spherical configuration, the sound-conducting material of member 49 at that end being also shaped in complementary manner to present a matching convex surface. The geometry of the curved transducer 20' provides a sound beam which travels within member 49 to converge toward a region on the longitudinal axis, preferably midway between the ends as is illustrated. Thus, over the major portion of their path the sound wavefronts are curved and are resolvable into tangents oriented with respect to the incoming light rays 14 throughout a range of angular values, as shown schematically in FIGS. 6, 6*a* and 6*b*. A more detailed exposition of the operation of curved sound wavefronts in a related context may be found in U.S. Pat. No. 3,373,380 to Robert Adler and assigned to the same assignee as the present invention. The radius of curvature of the transducer 20' determines the amount of curvature of the wavefronts, and therefore the extent of this angular range; in the present embodiment it is chosen to provide curved sound wavefronts resolvable into tangents over an angular range of 100 milliradians.

Figures 6, 6A, 6B, 7:
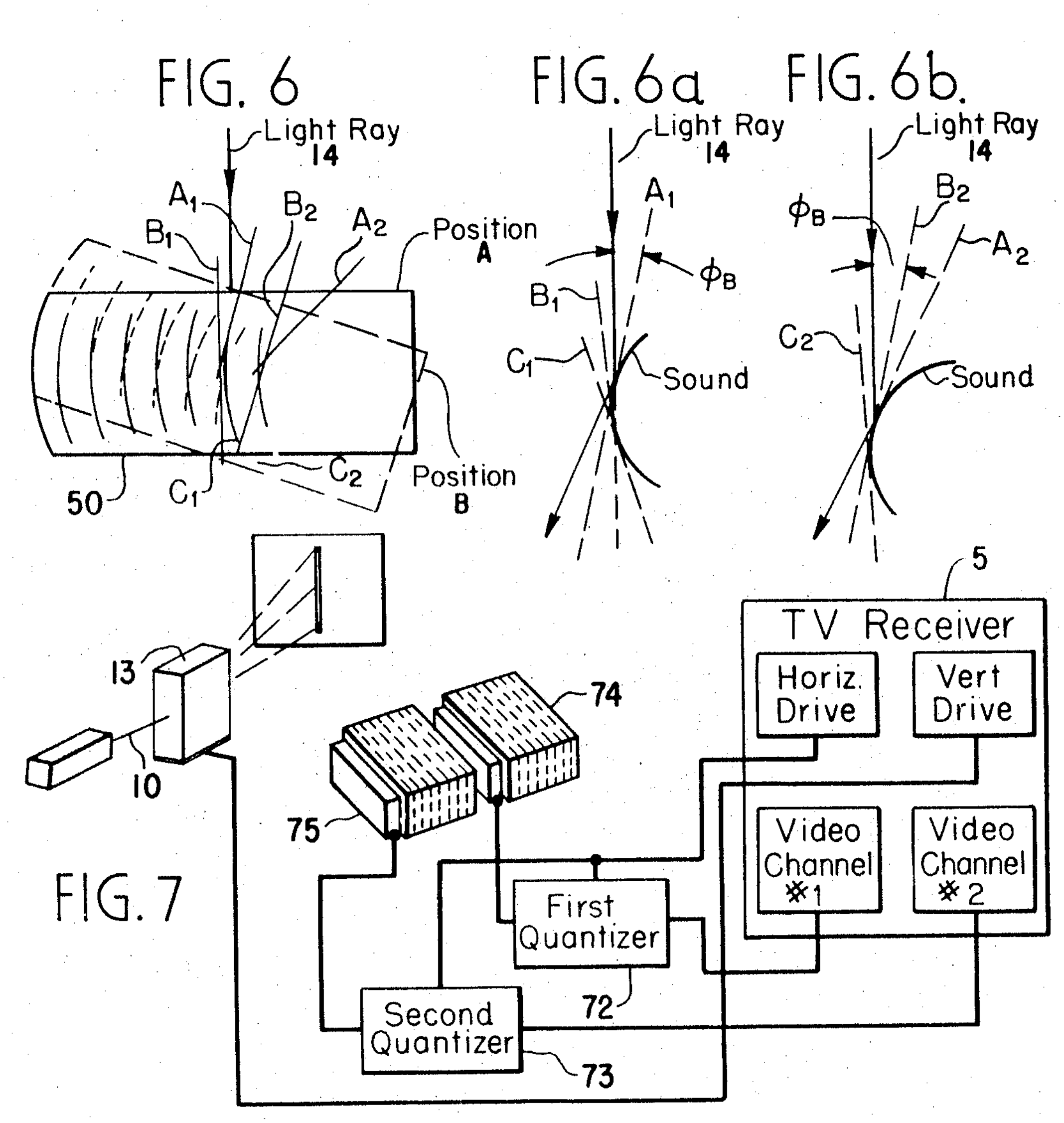
FIG. 6 is a cross-section of the cell of FIG. 5 taken along a horizontal plane illustrating the manner in which the curved wavefront of the sound beam provides tolerance to rotational motion of the cell from position A to position B.
FIG. 6*a* illustrates schematically the light-sound interaction within the cell of FIG. 5 in position A.
FIG. 6*b* illustrates schematically the light-sound interaction within the cell of FIG. 5 in position B.
FIG. 7 is a perspective view schematically illustrating a stereo virtual image display system according to the invention.

The manner in which substantial tolerance to rotational motion of cell 50 in achieved is illustrated in the FIG. 6 schematic cross-sectional view of the cell taken across a horizontal plane, with two exemplary rotational positions A and B shown superimposed. One of the schematically illustrated curved sound wavefronts in each case is resolved into exemplary tangents. In position A the exemplary tangents are $A_1$, $B_1$, $C_1$ while in position B the same wavefront resolved in the same manner will have exemplary tangents $A_2$, $B_2$ and $C_2$, the same tangents as previously but rotated by an amount determined by the change in position of the cell.

The same light ray 14 in either position A or position B will find a component of the same curved wavefront oriented correctly for interaction at the Bragg angle as is more clearly illustrated in FIG. 6*a* for position A, and in FIG. 6*b* for position B. Since the same curved sound wavefront affords many possible tangents, if the rotation is not too great (in this case not more than 100 milliradians or 6°), one such tangent will intersect the incoming light ray 14 at the Bragg angle at every position within the tolerance range. FIGS. 6*a* and 6*b* more clearly illustrate this for the exemplary positions A and B respectively. If tangent $A_1$ is properly oriented for Bragg interaction with respect to incoming light ray 14, then when the cell 50 and consequently the sound wavefront is rotated to position B, tangent $B_2$ will now be properly oriented for Bragg interaction. The result is that each individual incoming light ray exemplified by ray 14 continues to be diffracted in the same manner regardless of the rotation of the position of viewing cell 50 within its tolerance range and consequently the viewer's perception of virtual image 26 remains unaffected by such motion.

As compared to the viewing cell 15 wherein the sound wavefronts are planar in nature so that the entire wavefront may be available for Bragg interaction with an incoming light ray, the viewing cell 50 does not achieve such efficiency of interaction because only a portion or component of any given curved sound wavefront will have the proper Bragg angle orientation. However, the sound transducer 20' produces a sound beam which not only has curved wavefronts, but also is a converging beam, so that more sound energy is concentrated closer to the longitudinal axis of the cell 50, preferably focusing to a maximum power density midway between the ends of the cell, as is shown most clearly in FIGS. 5 and 5*a*. Then at the midpoint of the cell a narrow axial region of relatively small height compared to the cell thickness will exist with much higher sound power density than at other points within the cell.

In the central region where the conical sound waves go through a focus, the acoustic wavefronts are not curved but are essentially plane. In this region, however, angular tolerance is provided by virtue of the short path available for light traveling across the sound wave. The fact that the angular tolerance in the focal region is the same as in the broader regions was shown in a paper by E. I. Gordon and M. G. Cohen "Acoustic Beam Probing Using Optical Techniques" Bell System Tech. J., Vol. 44, page 693, 1965.

The 1 × 1 telescope which the cylindrical lenses 51 and 52 constitute has the important function of directing the incoming light through a narrow region about the longitudinal axis of that member. As has been stated, a high sound power density exists along the longitudinal axis and in particular about that portion of the axis midway between the ends of the interaction member 49. Accordingly, the effectiveness of light-sound interaction within this central region midway between the ends is greatly enhanced. This is the region through which an observer should view the virtual image 26. Used in this manner, the cell 50 exhibits an image comparable in brightness to that of viewing cell 15, while mitigating the requirement of maintaining a fixed head position so as not to degrade the display. It should be noted that the cylindrical lenses 51 and 52 have the effect of inverting the vertical component of the image. However, this is easily compensa by, for example, inverting the direction of the vertical scan.

Especially when using cell 50 as the viewing cell of the display device, the effectiveness of the light-sound interaction, and consequently, the brillance and quality of the virtual image 26 may be further enhanced by adapting the video modulation and acoustic signal quantizing system of U.S. Pat. 3,488,437 to Adrianus Korpel and assigned to the same assignee as the present invention. The signal quantizing improves performance by enabling the display to develop many individual picture elements simultaneously while sustaining them over a prolonged time interval, rather than time-sequentially, by the application of a corresponding distribution of acoustic frequencies at the same time over such a time interval to viewing cell 15 or 50. Regardless of the type of viewing cell used, adapting the Korpel system has the further advantage of eliminating the need for a separate light-intensity modulator such as cell 8 in FIGS. 1 and 3. This, of course, simplifies the optical component requirements and consequently the packaging of those components into a single viewing unit.

But more importantly, this makes possible yet another advantageous three-dimensional stereo display system, shown schematically in FIG. 7. Since the two-dimensional stereo system and the multiple-channel system for providing different pictures for different viewers are alike except for the latter having more channels and corresponding viewing cells, only the two-channel system for stereo is illustrated. The conventional television receiver as described in the previous embodiments is replaced by one which provides two or more separate video channels but which is otherwise the same. Each such channel then is connected to an independent quantizer and viewing cell, the former being the aforementioned Korpel system; thus the video signals provided by the first and second video channels are received by first and second quantizers 72 and 73, respectively, which in turn actuate respective viewing cells 74 and 75, one for each of the viewer's eyes, and likewise for additional channels. In the stereo system case, both eyes then view the same light spot or light line 12 through the viewing cells as previously, with the line being constructed by a vibrating mirror, 13 which deflects a laser beam 10 as in any of the previous embodiments, while in the multiple channel system, each viewer with his respective cell also views a single light spot or line 12, as previously. Alternatively, the vibrating mirror 13 may be replaced by a Bragg cell deflector such as cell 15 in FIG. 1 driven by a generator such as 18.

For ease of understanding and comparison to previously described embodiments, the description of the construction and operation hereafter will be limited to the first channel of the two stereo viewing channels or the first of a plurality of individual viewing channels; but since the other channel or channels operate independently and in a parallel manner, the description is equally applicable to both. Of course, the second and further channel components may be dispensed with entirely, and a conventional television receiver providing only a single video signal be used instead, resulting in a single-viewing-cell system as in the previous embodiments but with the advantages of the Korpel quantizing system; the following description would likewise be applicable to such a system.

Figure 8:
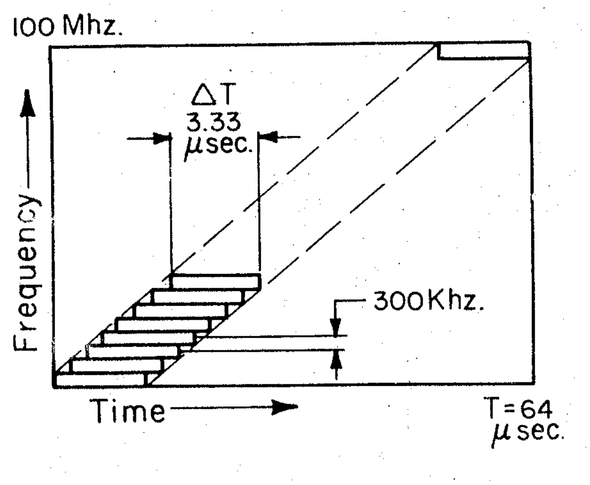
FIG. 8 is a plot useful in explaining the manner in which a video signal is quantized in the system of FIG. 7.

Accordingly, returning to the first channel of FIG. 7, quantizer 72 develops a plurality N of signals of differing frequencies, each of which sequentially represents a different equal interval of time, one of which is represented as ΔT in FIG. 8, within a horizontal line scan time period T. Quantizer 72 is connected to the horizontal output of conventional television receiver 5 so as to be synchronized to the scanning interval and duration of the receiver, typically 64 microseconds. Each of the plurality of signals has an amplitude corresponding to the amplitude of the video signal during the interval of line scan time represented by the respective signal derived from the video circuits of the receiver 5 for this purpose.

This video-modulated plurality of signals, now representing the video amplitude at each horizontal image element position by a set of signals of different frequencies, is developed and stored by quantizer 72; then the quantizer, taking the place of generator 18 in the other embodiments, simultaneously or nearly simultaneously delivers the plurality of signals to transducer 20' for a substantial time period. As will be seen below, this period may be as long as the line trace time.

The minimum frequency separation between each of the plurality N of signals which represent sequentially different time intervals or samples within a horizontal line scan time period is determined by the time taken by the sound wavefronts to travel across the aperture width. For a sound cell using a tellurium dioxide crystal as the sound conducting medium and when the human eye determines the viewing aperture width, typically about 2 millimeters, the transit time for the sound waves across the viewing aperture is about 3.33 microseconds and the minimum frequency separation is about 300 KHz.

Figure 2:
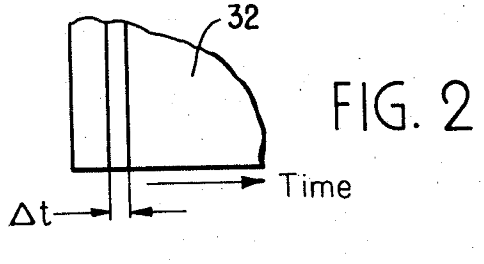
FIG. 2 is a graphical illustration of conventional video signal during one scan line time period.

Thus the quantizing system of the referenced Korpel patent preferably quantizes the video signal, illustrated at FIG. 2 into constant-frequency consecutive signal bursts having frequencies 300 KHz apart and each signal lasting 3.33 microseconds FIG. 8 plots the essential features of such a quantization of the video signal. To stay within a 100 MHz bandwidth and provide a minimum frequency separation of 300 KHz, a complete video line of 64 microseconds may be quantized into 333 signal samples. A somewhat different allocation of signal frequency and time interval within the line scan time is also possible. Thus the video signal may be divided into 666 overlapping samples, each lasting 666 microseconds and having a frequency separation of 150 KHz. However the system resolution may of course be limited by the resolution capability of the viewing cell which, in the present state of the art, is typically about 300 to 350 line pairs.

Nevertheless, quantization into a larger number of samples is found to be very useful in that the apparent brightness of the image furnished by any viewing cell to the viewer is greatly increased when each image element is made to persist even longer than the transit time of the sound waves across the viewing aperture, and one way of doing this is to stretch the time-persistence of the elementary signal samples out to more than 3.33 microseconds, for instance, to 6.66 microseconds as just mentioned. An even greater improvement beyond that afforded due to longer signal persistance is brought about if a resonant sound cavity is used in conjunction with the viewing cell. For this purpose, the member 49 (FIG. 5) may also be provided on the end 54 opposite the transducer 20' with a similar complementary convex surface covered with a sound reflector 55 so that a resonant cavity is formed. In this case, the radius of curvature and the length of the cell between the two curved surfaces are proportioned to render the curved surfaces concentric so that maximum resonant efficiency is obtained. Sound wavefronts within such a cell undergo multiple in-phase transits across the sound cell when it is actuated by long-persistence signals. The round-trip line for acoustic waves, here of 6.66 microseconds, is such that the multiply reflected sound wavefronts coincide in phase, raising the sound pressure within the cell and causing stronger light-sound interactions, and therefore greater brightness in the image. Of course, even when viewing cells not employing the resonant cavity are used, they nevertheless benefit from a stretched signal sample because of the increased persistence of each image element. Conversely, even if the applied signals are shorter than one roundtrip, the cavity still lengthens the signal and thus saves power.

Figure 9:
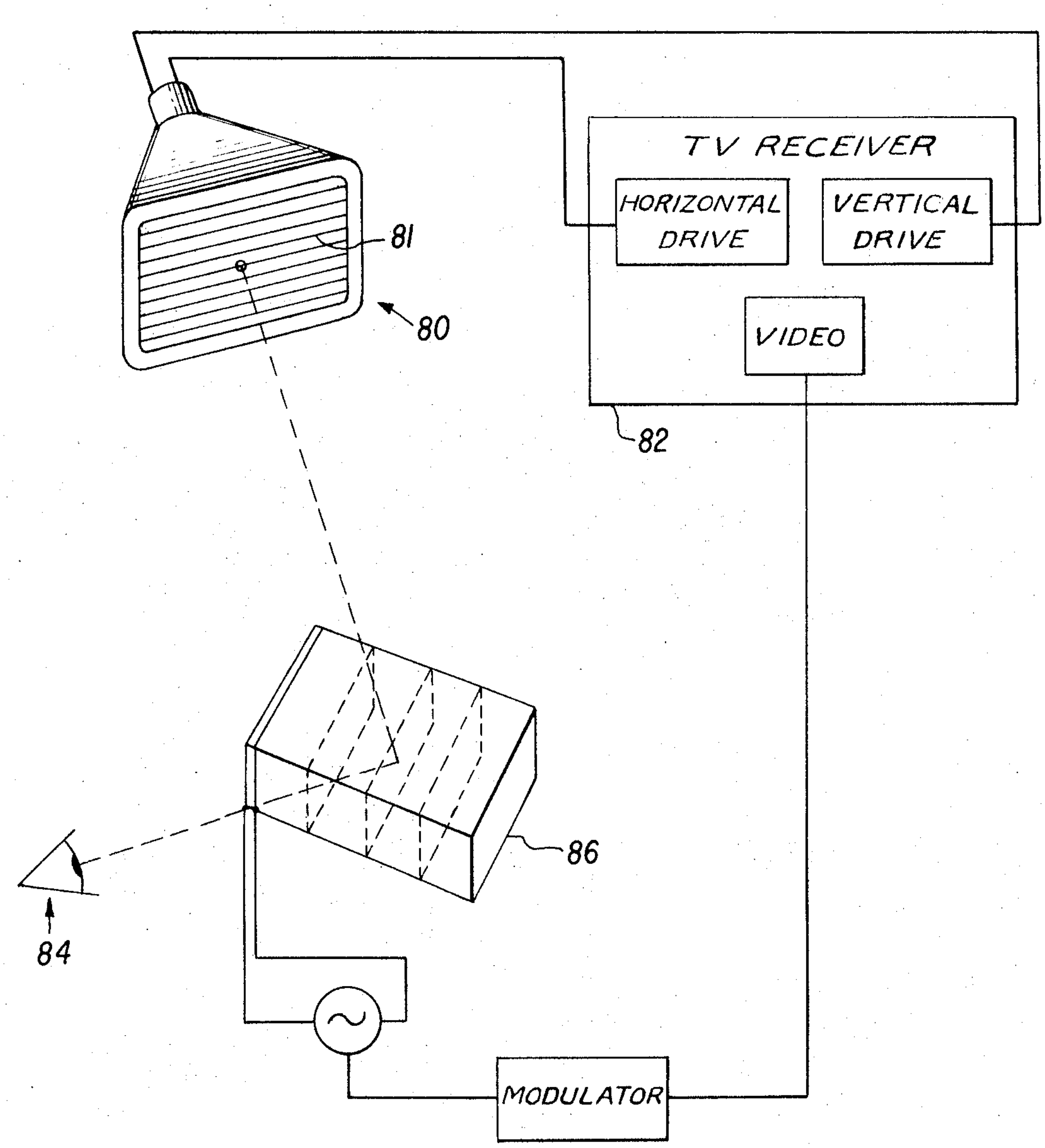
FIG. 9 is a schematic perspective view of yet another embodiment of the invention.

As has been noted in connection with FIG. 3, acousto-optics is not the only way in which virtual displays according to the invention may be accomplished; a particularly convenient alternative system useful in the stereo or multi-channel viewing context just described is a system as shown in FIG. 9 wherein a short-persistence cathode-ray tube 80 displayed a blank raster 81 in response to control signals from a television receiver 82, and each viewer, or eye 84 in the case of the illustrated stereo system, viewed that raster through an electro optical element 86 imposing intensity modulation upon the light received by the eye in accordance with respective separate video signals synchronized with the scan producing the raster.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A virtual image viewing system including a component to be worn by an observer in the manner of spectacles, said system being responsive to a source of video signals and associated deflection signals and to a spatially coherent input light source for establishing a virtual optical image representing said video signals which is visible only to the observer, comprising:

flying spot scanning means responsive to said deflection signals for forming an unmodulated flying spot raster; and a Bragg light-sound interaction cell constituting said component to be worn, said cell being responsive to said video signals and receiving light from the flying spot raster for modulating the received light to develop a virtual image representing said video signals which is visible only to the observer.

2. A virtual image viewing system including a component to be worn by an observer in the manner of spectacles, said system being responsive to a source of video signals and associated deflection signals and to a spatially coherent input light beam for establishing a virtual optical image representing said video signals which is visible only to the observer, comprising:

a first Bragg light-sound interaction cell responsive to said input light beam and the said video signals for modulating the beam and converging it to a spot; and means including a second Bragg light-sound interaction cell constituting said component to be worn which is responsive to said deflection signals and receives light from said spot for deflecting the received light in two dimensions to form a virtual image representing said video signals which is visible only to the observer.

3. A virtual image viewing system including a component to be worn by an observer in the manner of spectacles, said system being responsive to a source of video signals and associated deflection signals and to a spatially coherent input light beam for establishing a virtual optical image representing said video signals which is visible only to the observer, comprising:

first Bragg light-sound interaction cell means responsive to said input light beam and to said video signals and deflection signals for modulating the light beam, for deflecting the beam in a first dimension, and for converging said beam to form a modulated line; and second Bragg light-sound interaction cell means constituting said component to be worn responsive to said deflection signals for receiving light from the flying spot developing said line and for deflecting the received light in a second dimension orthogonal to said first dimension to develop a virtual image representing said video signals which is visible only to said observer.

4. A virtual image viewing system including a component to be worn by an observer in the manner of spectacles, said system being responsive to a source of video signals and associated deflection signals and to a spatially coherent input light beam for establishing a virtual optical image representing said video signals which is visible only to the observer, comprising:

a first Bragg light-sound interaction cell responsive to said input light beam and said deflection signals for deflecting in a first dimension and for converging said light beam to form an unmodulated line; and a second Bragg light-sound interaction cell constituting said component to be worn, responsive to said video signals and said deflection signals for receiving light from the flying spot developing said line and for modulating the received light and deflecting the received light in a second dimension orthogonal to said first dimension to develop a virtual image representing said video signals which is visible only to said observer.

* * * * *